(12) United States Patent
Muramatsu et al.

(10) Patent No.: US 7,897,969 B2
(45) Date of Patent: Mar. 1, 2011

(54) SOLID-STATE IMAGE PICKUP DEVICE, DRIVING METHOD FOR SOLID-STATE IMAGE PICKUP DEVICE, AND IMAGE PICKUP APPARATUS

(75) Inventors: Yoshinori Muramatsu, Kanagawa (JP); Takahiro Abiru, Kanagawa (JP); Takaichi Hirata, Kanagawa (JP)

(73) Assignee: Sony Corporation, Tokyo (JP)

( * ) Notice: Subject to any disclaimer, the term of this patent is extended or adjusted under 35 U.S.C. 154(b) by 458 days.

(21) Appl. No.: 11/405,938

(22) Filed: Apr. 18, 2006

(65) Prior Publication Data

US 2006/0237721 A1 Oct. 26, 2006

(30) Foreign Application Priority Data

Apr. 26, 2005 (JP) ............................. 2005-127628

(51) Int. Cl.
*H01L 29/04* (2006.01)
(52) U.S. Cl. .................. 257/59; 257/184; 257/187; 257/259; 257/292; 257/461; 257/219; 257/239; 257/240; 257/246; 257/E27.082; 257/E27.083; 257/E27.15; 257/E27.163; 257/E29.065
(58) Field of Classification Search ............... 257/59, 257/184, 187, 259, 292, 461, 219, 225, 239, 257/240, 246, E27.082, E27.083, E27.15, 257/E27.163, E29.065
See application file for complete search history.

(56) References Cited

U.S. PATENT DOCUMENTS

| 5,706,368 | A  | * | 1/1998 | Mita ........................... 382/284 |
| 5,724,440 | A  | * | 3/1998 | Funada et al. ................ 382/162 |
| 5,754,241 | A  | * | 5/1998 | Okada et al. ........... 375/240.05 |
| 6,175,383 | B1 | * | 1/2001 | Yadid-Pecht et al. ........ 348/302 |
| 2005/0099510 | A1 | * | 5/2005 | Nakazono et al. ......... 348/231.3 |
| 2005/0099610 | A1 | * | 5/2005 | Silverbrook et al. ......... 353/122 |
| 2006/0044243 | A1 | * | 3/2006 | Rysinski ....................... 345/92 |

* cited by examiner

*Primary Examiner* — Wael M Fahmy
*Assistant Examiner* — Marc Armand
(74) *Attorney, Agent, or Firm* — Robert J. Depke; Rockey, Depke & Lyons, LLC

(57) ABSTRACT

A solid-state image pickup device includes a pixel array area in which pixels each including a photoelectric conversion element are two-dimensionally arranged; first control means for performing control such that signals of pixels in a desired region of the pixel array area are sequentially read row by row; and second control means for performing control such that, when the signals of the pixels in the desired region are sequentially read row by row by the first control means, pixels in particular regions below and above the desired region are sequentially reset row by row.

7 Claims, 7 Drawing Sheets

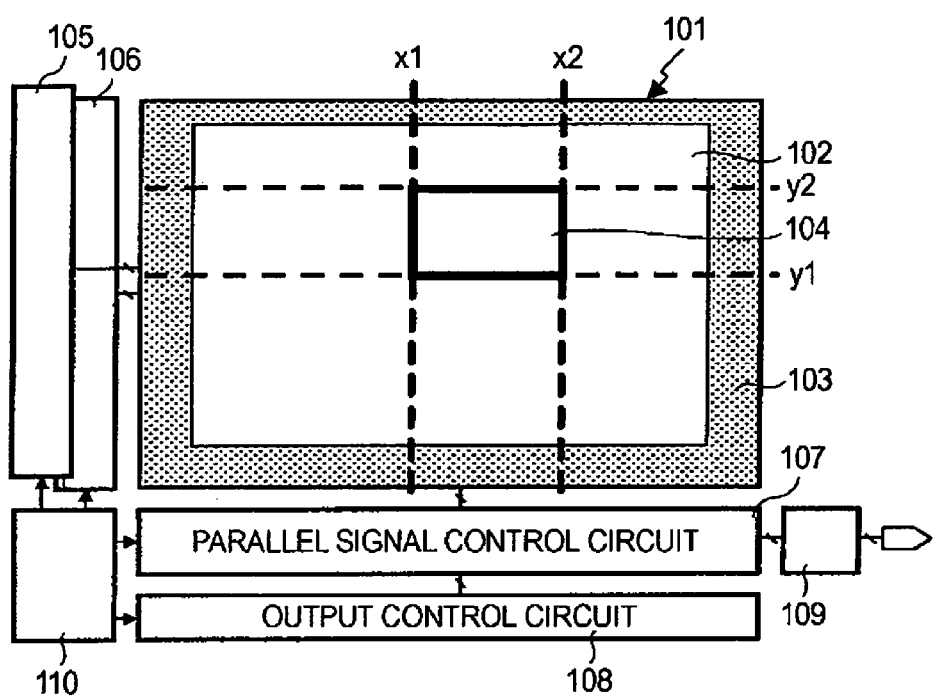
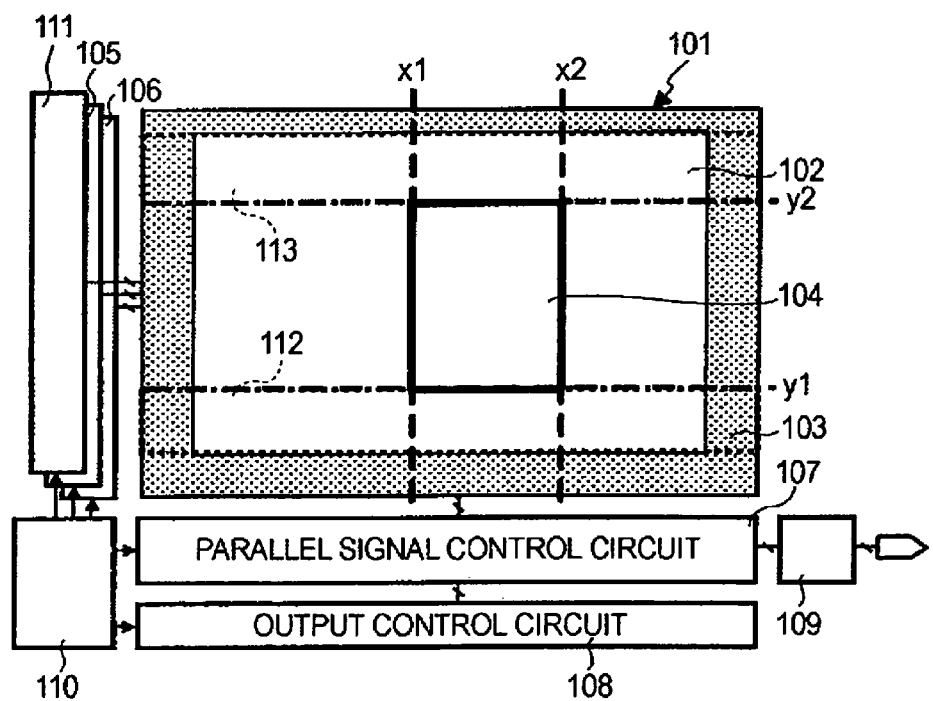

SOLID-STATE IMAGE PICKUP DEVICE, DRIVING METHOD FOR SOLID-STATE IMAGE PICKUP DEVICE, AND IMAGE PICKUP APPARATUS

CROSS REFERENCES TO RELATED APPLICATIONS

The present invention contains subject matter related to Japanese Patent Application JP 2005-127628 filed in the Japanese Patent Office on Apr. 26, 2005, the entire contents of which are incorporated herein by reference.

BACKGROUND OF THE INVENTION

1. Field of the Invention

The present invention relates to solid-state image pickup devices, driving methods for solid-state image pickup devices, and image pickup apparatuses, and more particularly, to an X-Y-address-type solid-state image pickup device that includes a pixel array area in which pixels each including a photoelectric conversion element are two-dimensionally arranged and that is capable of segmenting and reading pixel information in a desired region of the pixel array area, to a driving method for the solid-state image pickup device, and to an image pickup apparatus using the solid-state image pickup device as an image pickup device.

2. Description of the Related Art

X-Y-address-type solid-state image pickup devices typified by complementary metal oxide semiconductor (CMOS) image sensors are capable of selecting pixels row by row, column by column, or pixel by pixel in a pixel array area in which pixels each including a photoelectric conversion element are two-dimensionally arranged. Thus, such X-Y-address-type solid-state image pickup devices are capable of segmenting and reading pixel information in a desired region of the pixel array area by designating the desired region. (See, for example, Japanese Unexamined Patent Application Publication No. 2001-45383.)

A CMOS image sensor that is capable of segmenting and reading pixel information in a desired region of a pixel array area is shown in FIG. 11 of Japanese Unexamined Patent Application Publication No. 2001-45383.

Referring to FIG. 11, in a pixel array area 101, pixels (not shown) each including a photoelectric conversion element are two-dimensionally arranged. The pixel array area 101 includes an effective pixel region 102, a light-shielded pixel region 103, and a partial-read region 104. In the effective pixel region 102, image light from an object is incident to each pixel, and a signal obtained by photoelectrically converting the image light at the pixel is used as an image pickup signal. The light-shielded pixel region 103 is disposed around the effective pixel region 102. Each pixel in the light-shielded pixel region 103 is light-shielded, and a signal of the pixel is used for determining a black level. The partial-read region 104 is a desired region that is externally set.

A row read control circuit 105, a row reset control circuit 106, a parallel signal processing circuit 107, an output control circuit 108, and an amplifying circuit 109 are disposed around the pixel array area 101. The row read control circuit 105 controls row reading of pixels corresponding to reading of a desired row range. The row reset control circuit 106 resets electric charges stored by photoelectric conversion at pixels in different rows, at the same time as row reading, to control a storage time of the electric charges to realize electronic shuttering (similarly to the row read control circuit 105, the operation of the row reset control circuit 106 corresponds to reading of the desired row range). The parallel signal processing circuit 107 performs noise removal, signal processing, A/D conversion, and the like for signals, in parallel, read from pixels in units of rows. The output control circuit 108 controls sequential outputs of the parallel signal processing circuit 107, and the operation of the output control circuit 108 corresponds to reading of a desired column range. The amplifying circuit 109 amplifies outputs of the parallel signal processing circuit 107 and outputs the amplified results to the outside. A timing control circuit 110 performs timing control corresponding to desired operation modes for the circuits.

In the known CMOS image sensor, when pixel information in the desired partial-read region 104 is sequentially read row by row, access control for reading and the like is not performed for pixels in rows below and above the partial-read region 104. Thus, electric charges photoelectrically converted and stored at a photoelectric conversion element in each of the pixels may exceed the storage capacity of the photoelectric conversion element and may leak to peripheral pixels. The electric charges that leak to the peripheral pixels affect image pickup in the peripheral pixels. In the known CMOS image sensor, when electric charges leak from pixels above and below the partial-read region 104 to pixels in the partial-read region 104, an abnormal image (generally, a brighter or whiter image) is acquired in the region to which the electric charges leak. This is a well-known phenomenon generally called "blooming".

SUMMARY OF THE INVENTION

In order to avoid such a blooming phenomenon, in the simplest way, for example, when reading of a desired row in the partial-read region 104 is performed, electric charges stored in photoelectric conversion elements in non-access rows above and below the partial-read region 104 can be reset simultaneously. In this case, however, it is difficult to configure a control circuit for performing reset control on all the non-access rows other than the desired partial-read region 104 while setting the partial-read region 104. In addition, there is a concern about increases in power consumption and noise for simultaneous resetting.

Thus, as shown in FIG. 12, a non-access row reset control circuit 111 is provided. When reading of a desired row in the partial-read region 104 is performed, the non-access row reset control circuit 111 can sequentially perform reset control for non-access row sequential reset regions 112 and 113 (the regions encircled by dotted lines in FIG. 12) above and below the desired partial-read region 104 row by row (in the example shown in FIG. 12, sequential resetting is performed from the bottom of the drawing).

In this method, for example, as shown in FIG. 12, when the number of rows of the partial-read region 104 is set to be equal to the total number of rows of the non-access row sequential reset regions 112 and 113, the non-access row sequential reset regions 112 and 113 include non-access rows immediately previous and immediately subsequent to the partial-read region 104. Thus, the partial-read region 104 is not influenced by blooming, and a desired purpose can be achieved.

However, when the number of rows of the partial-read region 104 is smaller than the total number of rows of the non-access row sequential reset regions 112 and 113 or when the non-access row sequential reset regions 112 and 113 are set biased toward below (or above) the partial-read region 104, as shown in FIG. 13, a time for reading a frame of the partial-read region 104 may end before resetting of the non-access row sequential reset regions 112 and 113 reaches a row/rows immediately previous or/and immediately subsequent to the partial-read region 104 (in the example shown in FIG. 13, sequential resetting is performed from the bottom of the drawing).

In this case, if a reset address of the non-access row reset control circuit 111 is reset at the termination of reading of a frame, reset control is not performed for a non-access row/rows immediately previous or/and immediately subsequent to the partial-read region 104. Thus, blooming may occur.

In contrast, if the reset address of the non-access row reset control circuit 111 is not reset at the termination of reading of a frame of the partial-read region 104, reset control is performed for non-access rows immediately previous and immediately subsequent to the partial-read region 104. However, since a cycle of sequential resetting is longer than a cycle of reading of the frame of the partial-read region 104, blooming may occur during the increased period.

Thus, it is desirable to provide a solid-state image pickup device that is capable of reliably suppressing occurrence of blooming irrespective of setting of a partial-read region, a driving method for the solid-state image pickup device, and an image pickup apparatus.

A solid-state image pickup device according to an embodiment of the present invention includes a pixel array area in which pixels each including a photoelectric conversion element are two-dimensionally arranged and is capable of sequentially reading signals of pixels in a desired region of the pixel array area row by row. The solid-state image pickup device sequentially resets pixels in particular regions below and above the desired region row by row when the signals of the pixels in the desired region are sequentially read row by row.

Since the solid-state image pickup device having the above-mentioned structure sequentially resets pixels in the particular regions row by row when the signals of the pixels in the desired region are sequentially read row by row, electric charges stored in a photoelectric conversion element in each pixel in the particular regions does not exceed the storage capacity of the photoelectric conversion element without performing a reading operation for a region other than the desired region. Thus, electric charges stored in the photoelectric conversion element in each pixel in the particular regions are less likely to exceed the storage capacity of the photoelectric conversion element and less likely to leak to peripheral pixels, that is, to pixels in a desired partial-read region.

Accordingly, occurrence of blooming can be reliably suppressed, irrespective of setting of the desired region.

BRIEF DESCRIPTION OF THE DRAWINGS

FIG. 11 is a block diagram schematically showing the structure of a CMOS image sensor according to a known technology;

FIG. 12 is a block diagram schematically showing the structure of a CMOS image sensor according to another known technology.

DESCRIPTION OF THE PREFERRED EMBODIMENTS

Embodiments of the present invention will be described with reference to the drawings.

First Embodiment

Figure 1:
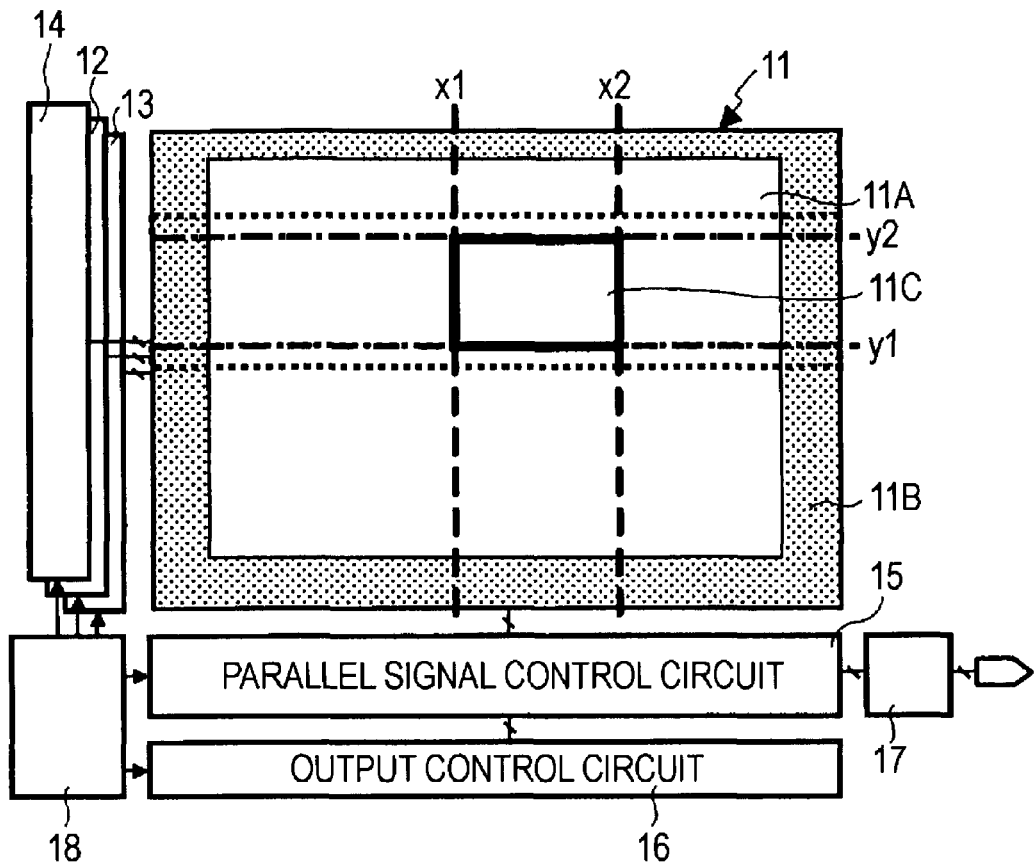
FIG. 1 is a block diagram schematically showing the structure of a CMOS image sensor according to an embodiment of the present invention.

FIG. 1 is a block diagram schematically showing the structure of an X-Y-address-type solid-state image pickup device, such as a CMOS image sensor, according to a first embodiment of the present invention.

Referring to FIG. 1, a CMOS image sensor according the first embodiment includes a pixel array area 11 in which pixels (not shown) each including a photoelectric conversion element are two-dimensionally arranged. The CMOS image sensor also includes a row read control circuit 12, a row reset control circuit 13, a non-access row reset control circuit 14, a parallel signal processing circuit 15, an output control circuit 16, an amplifying circuit 17, and a timing control circuit 18, which are peripheral circuits of the pixel array area 11. These peripheral circuits are formed, for example, on the same chip (semiconductor substrate) as the pixel array area 11.

The pixel array area 11 includes an effective pixel region 11A, a light-shielded pixel region 11B, and a partial-read region 11C. In the effective pixel region 11A, image light from an object is incident to each pixel, and a signal obtained by photoelectrically converting the image light at the pixel is used as an image pickup signal. The light-shielded pixel region 11B is disposed around the effective pixel region 11A. Each pixel in the light-shielded pixel region 11B is light-shielded, and a signal of the pixel is used for determining a black level. The partial-read region 11C is a desired region that is externally set. In the pixel array area 11, a vertical signal line 19 (see FIG. 2) is provided for each column in the pixel arrangement in the matrix form.

Although an example in which the light-shielded pixel region 11B is disposed in four sides of the effective pixel region 11A is shown in FIG. 1, the light-shielded pixel region 11B is not necessarily disposed in all the four sides. The light-shielded pixel region 11B may be disposed in three sides, two sides, or one side of the effective pixel region 11A.

The row read control circuit 12 has a basic structure of, for example, an address decode circuit. The row read control circuit 12 controls row reading of pixels corresponding to reading of a desired row range in the pixel array area 11. The row reset control circuit 13 has a basic structure of, for example, an address decode circuit. The row reset control circuit 13 resets electric charges stored by photoelectric conversion at pixels in different rows, at the same time as row reading, to control a storage time of the electric charges to realize electronic shuttering (similarly to the row read control circuit 12, the operation of the row reset control circuit 13 corresponds to reading of the desired row range).

The non-access row reset control circuit 14 has a basic structure of, for example, an address decode circuit. When sequential reading of the partial-read region 11C is performed row by row, the non-access row reset control circuit 14 performs sequential reset control for pixels of non-access row reset regions 11D and 11E (the regions encircled by dotted lines in FIG. 1) below and above the partial-read region 11C (similarly to the row read control circuit 12, the operation of the non-access row reset control circuit 14 corresponds to reading of the desired row range). The number of rows of the non-access row reset regions 11D and 11E can be set in accordance with an externally set value for the timing control circuit 18, as described later.

The parallel signal processing circuit 15 performs noise removal, signal processing, A/D conversion, and the like for signals, in parallel, read from pixels of the pixel array area 11 in units of rows. The output control circuit 16 includes a horizontal selection switch, a horizontal signal line, a horizontal scanning circuit, and the like for each column. The output control circuit 16 sequentially outputs, under the horizontal scanning by the horizontal scanning circuit, signals for a row that are processed in parallel by the parallel signal processing circuit 15, and sequentially outputs only signals within a desired column range.

The amplifying circuit 17 amplifies signals sequentially output from the parallel signal processing circuit 15, and outputs the amplified signals to outside the chip. The timing control circuit 18 generates various timing signals for desired operation modes for the row read control circuit 12, the row reset control circuit 13, the non-access row reset control circuit 14, the parallel signal processing circuit 15, and the output control circuit 16. The timing control circuit 18 performs timing control for each circuit in accordance with the corresponding timing signal.

Figure 2:
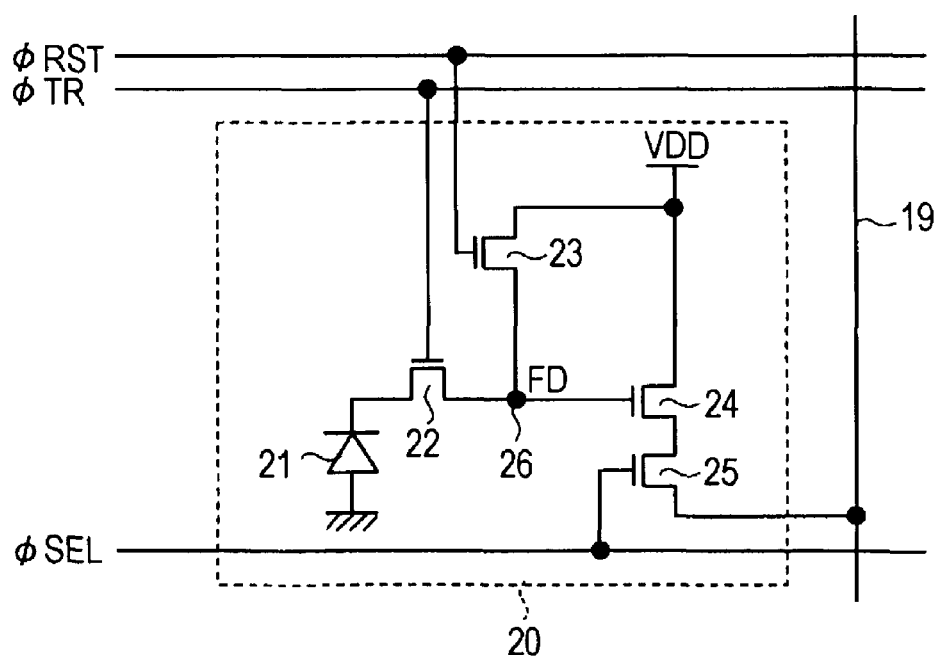
FIG. 2 is a circuit diagram showing an example of the circuit structure of a unit pixel.

FIG. 2 is a circuit diagram showing an example of the circuit structure of a unit pixel. Referring to FIG. 2, a pixel 20 includes a photoelectric conversion element, such as a photodiode 21. The pixel 20 also includes four transistors, that is, a transfer transistor 22, a reset transistor 23, an amplifying transistor 24, and a selecting transistor 25. The transistors 22 to 25 are, for example, N-channel MOS transistors.

The transfer transistor 22 is connected between the cathode of the photodiode 21 and a floating diffusion (FD) portion 26. When a transfer pulse φTR is supplied to the gate of the transfer transistor 22, the transfer transistor 22 transfers to the FD portion 26 a signal charge (here, an electron) that is photoelectrically converted and stored at the photodiode 21.

The drain of the reset transistor 23 is connected to a power supply VDD, and the source of the reset transistor 23 is connected to the FD portion 26. Before the photodiode 21 transfers a signal charge to the FD portion 26, when a reset pulse φRST is supplied to the gate of the reset transistor 23, the potential of the FD portion 26 is reset to the power potential VDD.

The amplifying transistor 24 has a source-follower configuration. That is, the gate of the amplifying transistor 24 is connected to the FD portion 26, the drain of the amplifying transistor 24 is connected to the power supply VDD, and the source of the amplifying transistor 24 is connected to the vertical signal line 19 via the selecting transistor 25. The amplifying transistor 24 outputs, as a reset level, the potential of the FD portion 26 after being reset by the reset transistor 23. The amplifying transistor 24 also outputs, as a signal level, the potential of the FD portion 26 after a signal charge is transferred from the transfer transistor 22.

For example, the drain of the selecting transistor 25 is connected to the source of the amplifying transistor 24, and the source of the selecting transistor 25 is connected to the vertical signal line 19. When a selecting pulse φSEL is supplied to the gate of the selecting transistor 25, the selecting transistor 25 is turned on and selects the pixel 20. The selecting transistor 25 may be connected between the power supply VDD and the drain of the amplifying transistor 24.

Although a case where the pixel 20 includes four transistors is described, this pixel structure is merely an example. The pixel 20 may have any of well-known structures. For example, the pixel 20 may not include the transfer transistor 22. Alternatively, the amplifying transistor 24 may also function as a selecting transistor and a pixel may be selected by controlling a drain potential. Alternatively, the amplifying transistor 24 may use a plurality of photodiodes 21.

Reading of signals from the pixel 20 in the pixel array area 11 in the CMOS image sensor according to the first embodiment is described next with reference to a timing chart shown in FIG. 3, together with the block diagram shown in FIG. 1 and the pixel circuit diagram shown in FIG. 2.

Signals are read from the pixel 20 under the control of the row read control circuit 12 and the row reset control circuit 13 for the non-access row reset control circuit 14 in accordance with various timing signals generated by the timing control circuit 18.

Figure 3:
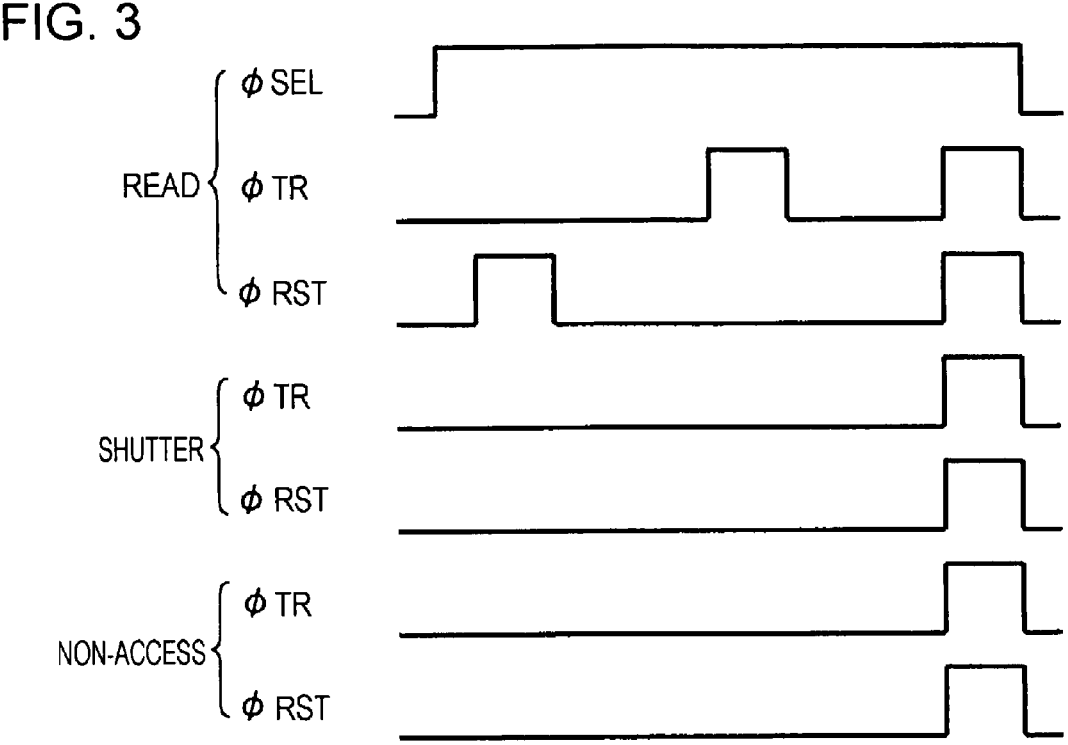
FIG. 3 is a timing chart for explaining a circuit operation of the CMOS image sensor according to the embodiment.

Referring to FIG. 3, a "read" row is not necessarily equal to a "shutter" row. If a "read" row is equal to a "shutter" row, an exposure time corresponds to one reading frame. If a "read" row is different from a "shutter" row, a time from resetting of the "shutter" row to reading corresponds to an exposure time. Accordingly, electronic shuttering can be performed.

In the first embodiment, "read" rows and "shutter" rows correspond to the partial-read region 11C shown in FIG. 1. "Non-access" rows correspond to the non-access row reset regions 11D and 11E.

As shown in FIG. 2, when the selecting pulse φSEL is activated, the pixel 20 is selected, and pixel information is output to the vertical signal line 19. If the transfer pulse φTR is activated during activation of the selecting pulse φSEL, a signal level based on information originated from electric charges stored in the photodiode 21 is read to the vertical signal line 19. If the reset pulse φRST is activated during activation of the selecting pulse φSEL, a reset level based on a reference level is read to the vertical signal line 19.

As described above, an operation for activating the reset pulse φRST and the transfer pulse φTR during activation of the selecting pulse φSEL is a reading operation of the pixel 20. Signals in a desired row that is read to the vertical signal line 19 are processed in the parallel signal processing circuit 15, and then, sequentially output to the outside through the timing control circuit 18 under the control of the output control circuit 16.

By activating the reset pulse φRST and the transfer pulse φTR after activating the transfer pulse φTR and the reset pulse φRST, electric charges stored in the photodiode 21 may be reset. The timing chart shown in FIG. 3 illustrates a timing relationship in such a case.

In contrast, if the transfer pulse φTR and the reset pulse φRST are activated without activating the selecting pulse φSEL, electric charges stored in the photodiode 21 can be reset. Performing this operation during activation of the selecting pulse φSEL in a read row allows electronic shuttering to start and electric charges in a non-access row to be reset in the present invention.

However, the timing relationship in reading of the pixel 20 shown in the timing chart in FIG. 3 is merely an example. The same operations and advantages can be achieved by setting timing for shuttering and timing for resetting a non-access row in a desired manner. In addition, if the pixel structure is changed as described above, even though a way of reading changes in accordance with the change in the pixel structure, the concept of the present invention can be easily adopted.

As described above, in the CMOS image sensor that is capable of segmenting and reading pixel information in the desired partial-read region 11C of the pixel array area 11, when pixel information in the partial-read region 11C is sequentially read row by row, sequential reset control is performed for pixels in the non-access row reset regions 11D and 11E below and above the partial-read region 11C row by row under the control of the non-access row reset control circuit 14. Thus, electric charges stored in the photodiode 21 of the pixel 20 are less likely to exceed the storage capacity of the photodiode 21 and less likely to leak to peripheral pixels. Therefore, occurrence of blooming can be reliably suppressed irrespective of setting of the partial-read region 11C.

Figure 4:
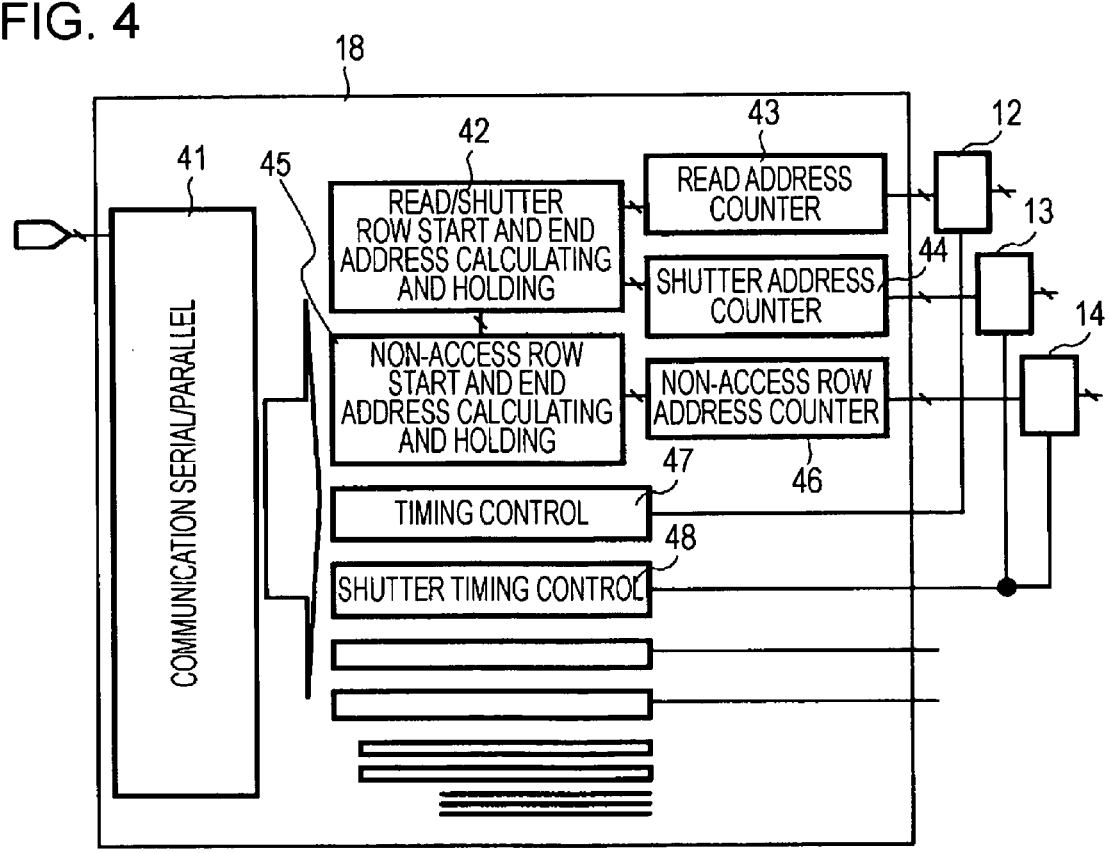
FIG. 4 is a block diagram showing a circuit structure of only a circuit portion relating to address control for performing read control.

The timing control circuit 18 that performs address control for performing the above-mentioned read control is described next. FIG. 4 is a block diagram showing the circuit structure of only a circuit portion relating to address control for performing the read control.

As shown in FIG. 4, the timing control circuit 18 includes a communication serial/parallel conversion block 41 that receives control for an address, an operation mode, and the like from the outside. The timing control circuit 18 also includes many individual blocks that perform timing control under the control of the communication serial/parallel conversion block 41.

The timing control circuit 18 in the first embodiment includes, as control blocks that perform the read control, a read/shutter row start and end address calculating and holding block 42, a read address counter block 43, a shutter address counter block 44, a non-access row start and end address calculating and holding block 45, a non-access row address counter block 46, a timing control block 47, and a shutter timing control block 48.

The read/shutter row start and end address calculating and holding block 42 calculates a read/shutter row start address and a read/shutter row end address, and holds the calculated addresses under the control of the communication serial/parallel conversion block 41. The read address counter block 43 and the shutter address counter block 44 perform control for start and termination of counting in accordance with the calculation results of the read/shutter row start and end address calculating and holding block 42.

The non-access row start and end address calculating and holding block 45 calculates a non-access row start address and a non-access row end address (addresses of the start row and the end row of each of the non-access row reset regions 11D and 11E) under the control of the communication serial/parallel conversion block 41, and holds the calculated addresses. The non-access row address counter block 46 performs control for start and termination of counting in accordance with the calculation results of the non-access row start and end address calculating and holding block 45.

The count result of the read address counter block 43 is supplied to the row read control circuit 12. The count result of the shutter address counter block 44 is supplied to the row reset control circuit 13. The count result of the non-access row address counter block 46 is supplied to the non-access row reset control circuit 14.

The timing control block 47 performs timing control for the row read control circuit 12 under the control of the communication serial/parallel conversion block 41. The shutter timing control block 48 performs timing control for the row reset control circuit 13 and the non-access row reset control circuit 14 under the control of the communication serial/parallel conversion block 41.

Each of the row read control circuit 12, the row reset control circuit 13, and the non-access row reset control circuit 14 basically has a structure of an address decode circuit. By acquiring a logical product of an output of the read address counter block 43, the shutter address counter block 44, or the non-access row address counter block 46 and a corresponding output of the timing control block 47 or the shutter timing control block 48, access to each pixel in the pixel array area 11 is achieved.

Figure 5:
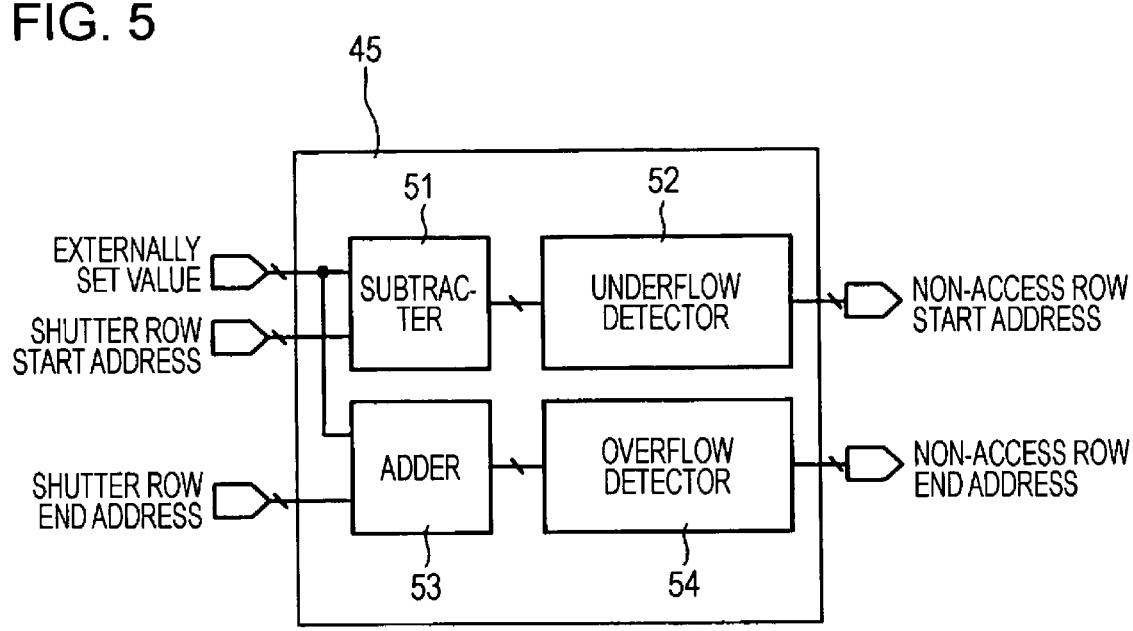
FIG. 5 is a block diagram showing an example of the structure of a non-access row start and end address calculating and holding block.

FIG. 5 is a block diagram showing an example of the structure of the non-access row start and end address calculating and holding block 45.

As shown in FIG. 5, the non-access row start and end address calculating and holding block 45 in the first embodiment includes a subtracter 51, an underflow detector 52, an adder 53, and an overflow detector 54.

An externally set value that defines the number of rows of the non-access row reset regions 11D and 11E is supplied from the communication serial/parallel conversion block 41 to the non-access row start address/non-access row end address calculating and holding block 45 in accordance with external setting (setting from outside the chip), and a shutter row start address, which is equal to a read row start address (the same applies to the following descriptions), and a shutter row end address, which is equal to a read row end address (the same applies to the following descriptions), are supplied from the read/shutter row start and end address calculating and holding block 42 to the non-access row start address/non-access row end address calculating and holding block 45.

The subtracter 51 subtracts the "externally set value" from the "shutter row start address", and inputs the subtraction result to the underflow detector 52. If the subtraction result of the subtracter 51 does not reach a predetermined value, that is, if underflow occurs, the underflow detector 52 sets a predetermined minimum value, and outputs the predetermined minimum value as a non-access row start address.

The adder 53 adds the "shutter row end address" to the "externally set value", and inputs the addition result to the overflow detector 54. If the addition result of the adder 53 exceeds a predetermined value, that is, if overflow occurs, the overflow detector 54 sets a predetermined maximum value, and outputs the predetermined maximum value as a non-access row end address.

The non-access row start address and the non-access row end address calculated by the non-access row start and end address calculating and holding block 45 are supplied to the non-access row address counter block 46 shown in FIG. 4. Thus, since pixels in the non-access row reset regions 11D and 11E below and above the partial-read region 11C can be sequentially reset row by row when pixel information in the partial-read region 11C is sequentially read row by row, occurrence of blooming can be suppressed.

In the CMOS image sensor according to the first embodiment, the number of rows of the non-access row reset regions 11D and 11E must be smaller than the number of rows of the partial-read region 11C. In addition, if the number of rows of the non-access row reset regions 11D and 11E is smaller than half the number of rows of the partial-read region 11C, after accessing the non-access row reset regions 11D and 11E, a dummy row outside the effective pixel region 11A is accessed during reading of the partial-read region 11C. Since a non-access row or a dummy row is accessed, apart from the partial-read region 11C, an operation does not change during reading. Thus, no influence due to a change in the operation is exerted on an image.

Although the basic structure of the CMOS image sensor according to the first embodiment has been described, various modifications can be made to the basic structure.

First Modification

Figure 6:
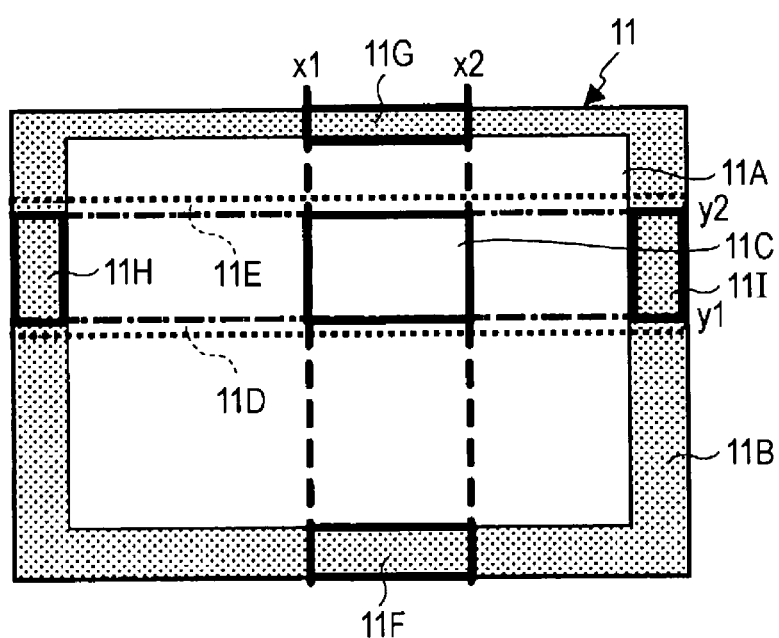
FIG. 6 is a schematic diagram showing a pixel array area in a CMOS image sensor according to a first modification of the present invention.

FIG. 6 is a schematic diagram showing the pixel array area 11 in a CMOS image sensor according to a first modification of the present invention. In FIG. 6, the equivalent parts as in FIG. 1 are referred to with the same reference numerals.

In the first modification, although the basic structure and operation are similar to those in the first embodiment, a feature of the first modification is that pixel information in ranges 11F and 11G (the ranges encircled by thick lines in FIG. 6) of the light-shielded pixel region 11B, as well as pixel information in the partial-read region 11C, is read when partial reading is performed.

In this case, for the non-access row reset regions 11D and 11E, operations and advantages provided by resetting can be achieved, as in the first embodiment. In addition, reading pixel information in the light-shielded pixel region 11B facilitates black level setting.

In the first modification, when the light-shielded pixel region 11B is disposed in all the four sides of the effective pixel region 11A, ranges 11F and 11G defined by addresses x1 and x2 and ranges 11H and 11I defined by addresses y1 and y2, the addresses x1, x2, y1, and y2 corresponding to the light-shielded pixel region 11B in all the four sides of the partial-read region 11C, are read. However, the present invention is not limited to this.

In other words, the light-shielded pixel region 11B may be disposed in three sides, two sides, or one side of the effective pixel region 11A. In addition, a light-shielded pixel region to be read may be disposed in three sides, two sides, or one side of the effective pixel region 11A.

Second Modification

Figure 7:
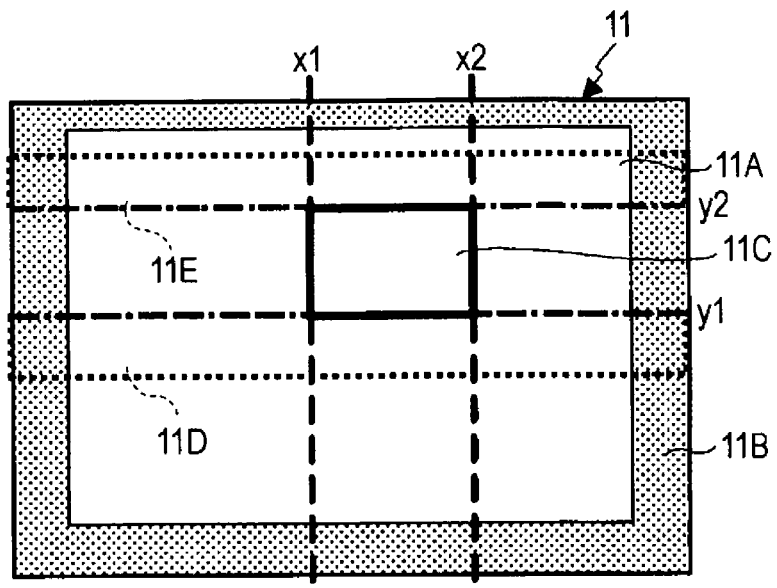
FIG. 7 is a schematic diagram showing a pixel array area in a CMOS image sensor according to a second modification of the present invention.

FIG. 7 is a schematic diagram showing the pixel array area 11 in a CMOS image sensor according to a second modification of the present invention. In FIG. 7, the equivalent parts as in FIG. 1 are referred to with the same reference numerals.

In the first embodiment, the number of rows of the non-access row reset regions 11D and 11E can be set in accordance with an externally set value. However, in the second modification, instead of externally setting the number of rows of the non-access row reset regions 11D and 11E, the number of rows of each of the non-access row reset regions 11D and 11E below and above the partial-read region 11C is fixedly set to half the number of rows of the partial-read region 11C.

Figure 8:
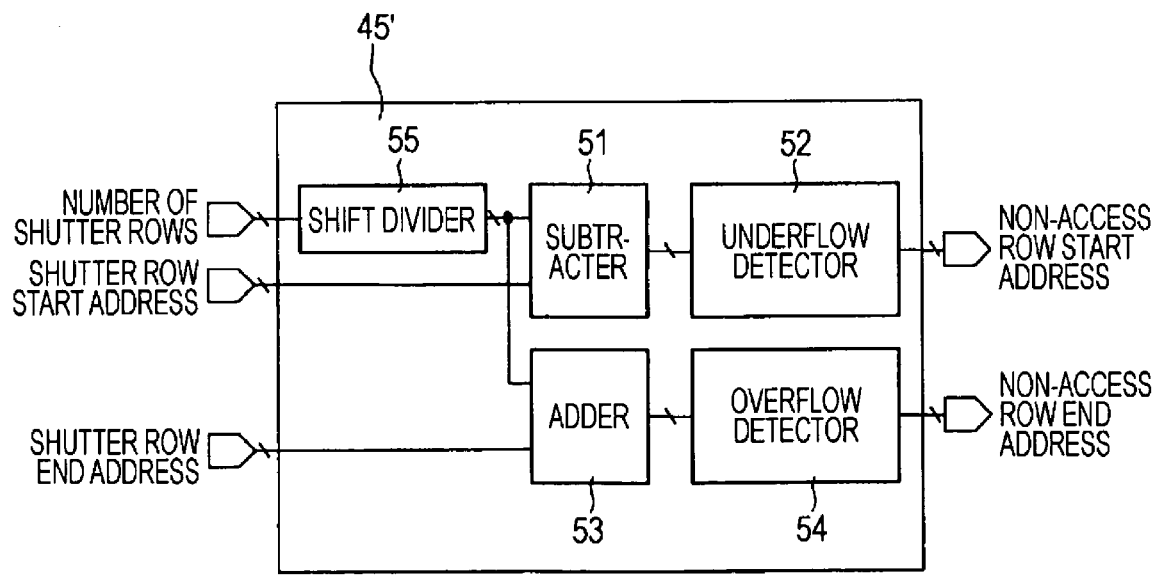
FIG. 8 is a block diagram showing an example of the structure of a non-access row start and end address calculating and holding block in the second modification.

FIG. 8 is a block diagram showing an example of the structure of a non-access row start and end address calculating and holding block 45' in the second modification. In FIG. 8, the equivalent parts as in FIG. 5 are referred to with the same reference numerals.

Referring to FIG. 8, the non-access row start and end address calculating and holding block 45' includes the subtracter 51, the underflow detector 52, the adder 53, and the overflow detector 54. The non-access row start and end address calculating and holding block 45' also includes a divider, such as a shift divider 55 that performs division by bit shift.

In addition to a shutter row start address and a shutter row end address, information on the number of shutter rows is supplied from the read/shutter row start and end address calculating and holding block 42 shown in FIG. 4 to the non-access row start and end address calculating and holding block 45'.

The shift divider 55 calculates half the number of shutter rows by division based on bit shift in accordance with the information on the number of shutter rows, and supplies the calculation result to the subtracter 51. The subtracter 51 subtracts "half the number of shutter rows" from the "shutter row start address", and inputs the subtraction result to the underflow detector 52. If underflow occurs in the subtraction result of the subtracter 51, the underflow detector 52 sets a predetermined minimum value, and outputs the predetermined minimum value as a non-access row start address.

The adder 53 adds the "shutter row end address" to "half the number of shutter rows", and inputs the addition result to the overflow detector 54. If overflow occurs in the addition result of the adder 53, the overflow detector 54 sets a predetermined maximum value, and outputs the predetermined maximum value as a non-access row end address.

The non-access row start address and the non-access row end address calculated as described above by the non-access row start and end address calculating and holding block 45 are supplied to the non-access row address counter block 46 shown in FIG. 4. Thus, pixels in the non-access row reset regions 11D and 11E below and above the partial-read region 11C are sequentially reset row by row when pixel information in the partial-read region 11C is sequentially read row by row. Thus, occurrence of blooming can be suppressed.

In addition, since the shift divider 55 is used as a divider that performs half division, a simple circuit structure having the shift divider 55, which is a divider performing division by bit shift, can be achieved. However, a divider that performs half division is not necessarily limited to the shift divider 55. A normal divider may be used, instead of the shift divider 55.

As described above, in the second modification, since the number of rows of each of the non-access row reset regions 11D and 11E is set to half the number of rows of the partial-read region 11C, there is no need to set the number of rows of the non-access row reset regions 11D and 11E. Thus, occurrence of blooming in the partial-read region 11C can be suppressed more simply. In addition, since the number of read rows is equal to the number of non-access rows without accessing a dummy row, the same operation is always performed. Thus, no influence due to a change in the operation is exerted on an image.

Third Modification

Figure 9:
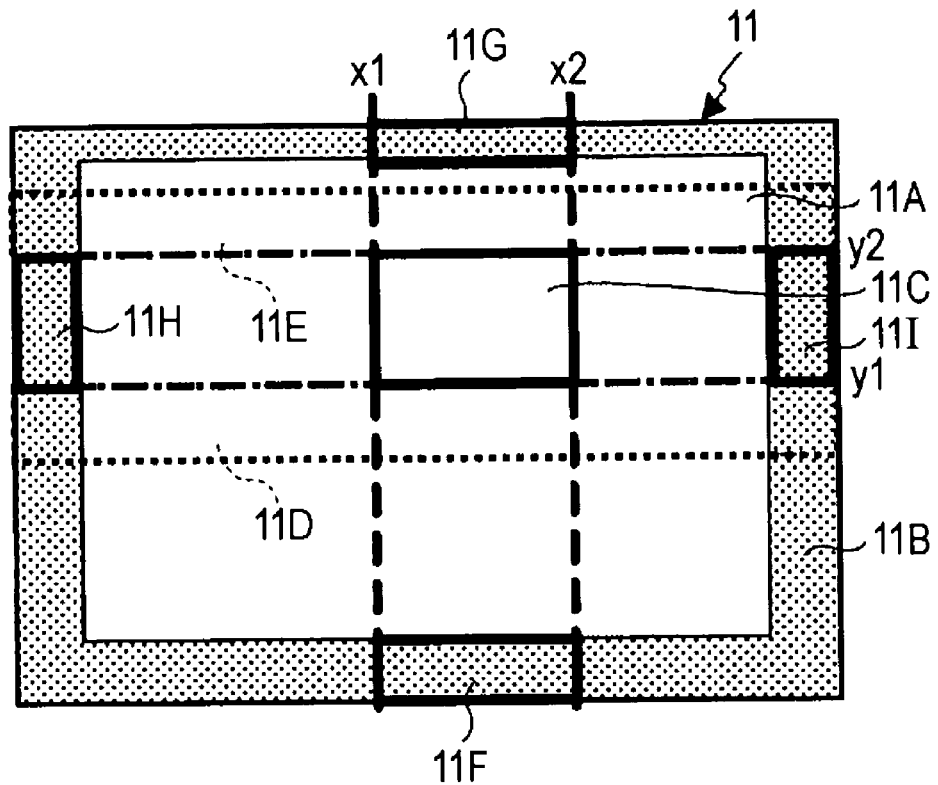
FIG. 9 is a schematic diagram showing a pixel array area in a CMOS image sensor according to a third modification of the present invention.

FIG. 9 is a schematic diagram showing the pixel array area 11 in a CMOS image sensor according to a third modification of the present invention. In FIG. 9, the equivalent parts as in FIG. 1 are referred to with the same reference numerals.

The basic structure and operation in the third modification are similar to those in the second modification. However, a feature of the third modification is that pixel information in the ranges 11F and 11G (the ranges encircled by thick lines) of the light-shielded pixel region 11B, as well as pixel information in the partial-read region 11C, is read, as in the first modification.

In this case, for the non-access row reset regions 11D and 11E, operations and advantages provided by resetting can be achieved, as in the second modification. In addition, reading pixel information in the light-shielded pixel region 11B facilitates black level setting.

In addition, in the third modification, the number of rows of the non-access row reset regions 11D and 11E is calculated in accordance with the number of shutter rows and the number of rows of the light-shielded pixel region 11B. Thus, the number of read rows is always equal to the number of non-access rows without accessing a dummy row. Therefore, the same operation is always performed, and no influence due to a change in the operation is exerted on an image.

In the third modification, when the light-shielded pixel region 11B is disposed in all the four sides of the effective pixel region 11A, the ranges 11F and 11G defined by addresses x1 and x2 and the ranges 11H and 11I defined by addresses y1 and y2, the addresses x1, x2, y1, and y2 corresponding to the light-shielded pixel region 11B in all the four sides of the partial-read region 11C, are read. However, the present invention is not limited to this.

In other words, the light-shielded pixel region 11B may be disposed in three sides, two sides, or one side of the effective pixel region 11A. In addition, a light-shielded pixel region to be read may be disposed in three sides, two sides, or one side of the effective pixel region 11A.

Although cases where a CMOS image sensor is used have been described in the first embodiment and the first to third modifications, a CMOS image sensor is not necessarily used. The present invention is applicable to an X-Y-address-type solid-state image pickup device that is capable of segmenting and reading pixel information in a desired region of a pixel array area.

Applications

An X-Y-address-type solid-state image pickup device typified by a CMOS image sensor according to the first embodiment, the first modification, the second modification, or the third modification is suitable to be used as an image pickup device in an image pickup apparatus, such as a video camera, a digital still camera, or a camera module for a mobile apparatus, such as a cellular phone.

Figure 10:
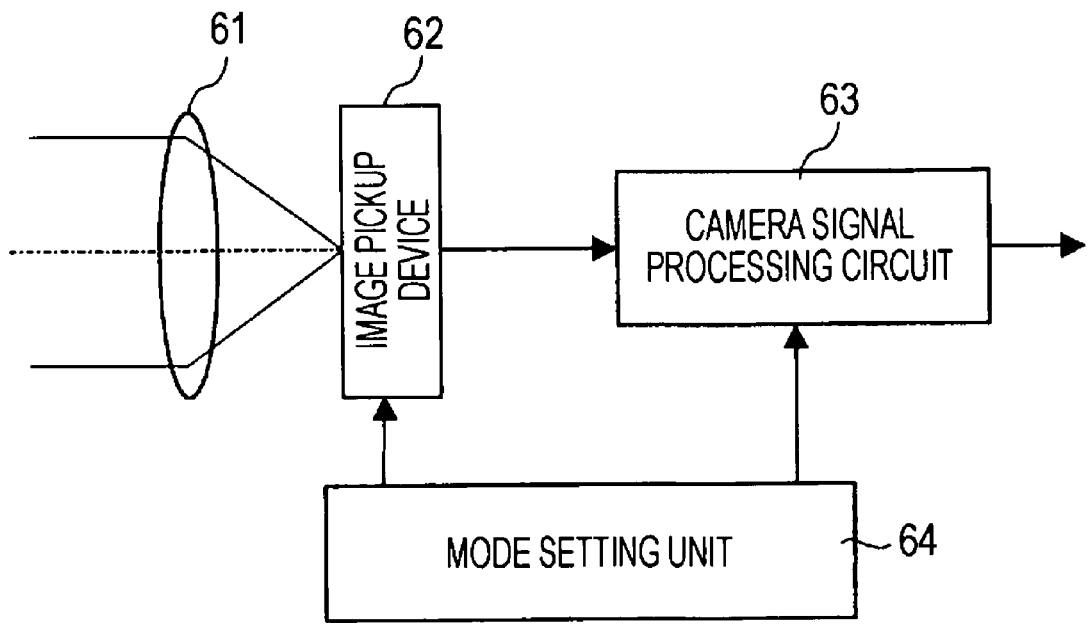
FIG. 10 is a block diagram showing an example of the structure of an image pickup apparatus according to an embodiment of the present invention.
Figure 13:
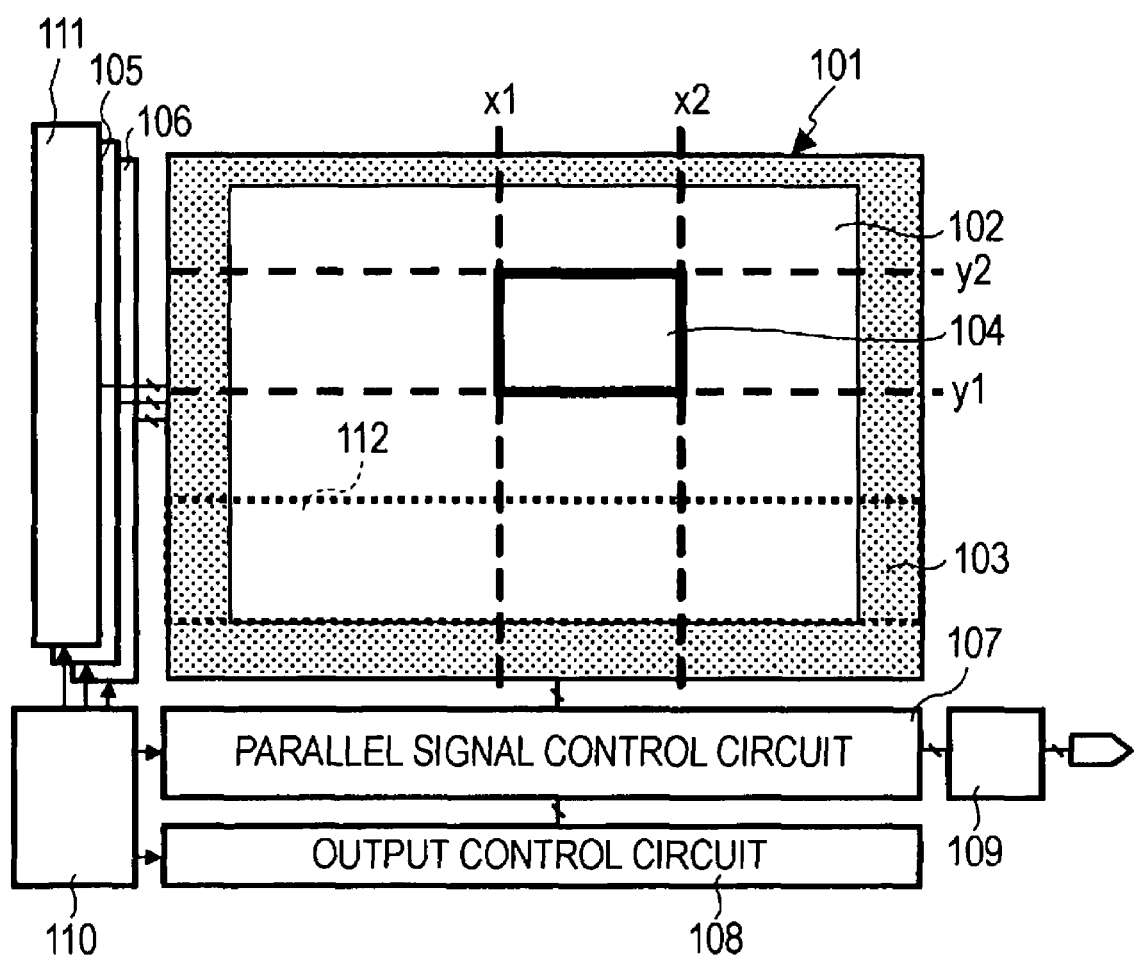
FIG. 13 is a block diagram schematically showing the structure of the CMOS image sensor according to the known technology.

FIG. 10 is a block diagram showing an example of the structure of an image pickup apparatus according to an embodiment of the present invention. Referring to FIG. 10, the image pickup apparatus according to this embodiment includes a lens 61, an image pickup device 62, a camera signal processing circuit 63, a mode setting unit 64, and the like.

The lens 61 forms image light from an object onto an image pickup face of the image pickup device 62. The image pickup device 62 converts the image light formed on the image pick up face by the lens 61 into electric signals pixel by pixel, and outputs the acquired image signals. An X-Y-address-type solid-state image pickup device typified by the CMOS image sensor according to the first embodiment, the first modification, the second modification, or the third modification is used as the image pickup device 62.

The camera signal processing circuit 63 performs various types of signal processing on image signals output from the image pickup device 62. In accordance with a user designation, the mode setting unit 64 selectively sets, as an operation mode for the image pickup device 62, an entire pixel read mode in which signals of all the pixels are individually read or a partial-read mode in which pixel information of a desired region of a pixel array area is segmented and read.

When the entire pixel read mode is set, the CMOS image sensor according to the first embodiment, the first modification, the second modification, or the third modification, which is used as the image pickup device 62, performs an operation for individually reading signals of all the pixels in a pixel array area. When the partial-read mode is set, the CMOS image sensor performs the series of operations described above, that is, operations for setting a desired partial-read region 11C of the pixel array area 11 and reading only signals of pixels in the partial-read region 11C.

As described above, in an image pickup apparatus, such as a video camera, an electronic still camera, or a camera module for a mobile apparatus, such as a cellular phone, when an X-Y-address-type solid-state image pickup device typified by a CMOS image sensor according to the first embodiment, the first modification, the second modification, or the third modification is used as the image pickup device 62, the solid-state image pickup device is capable of reliably suppressing occurrence of blooming irrespective of setting of the partial-read region 11C when pixel information in the partial-read region 11C is sequentially read row by row. Thus, the image quality of picked up images can be improved.

In particular, in the CMOS image sensor according to the second or third modification, the number of read rows is equal to the number of non-access rows without accessing a dummy row. Thus, the same operation is always performed, and no influence due to a change in the operation is exerted on an image. Therefore, the image quality of picked up images can be further improved.

It should be understood by those skilled in the art that various modifications, combinations, sub-combinations and alterations may occur depending on design requirements and other factors insofar as they are within the scope of the appended claims or the equivalents thereof.

What is claimed is:

1. A solid-state image pickup device comprising:
a pixel array area in which pixels each including a photoelectric conversion element are two-dimensionally arranged;
first control unit for performing control such that signals of pixels in a desired region of the pixel array area are sequentially read row by row; and
second control unit for performing control such that, at least some of the pixels in regions except for the desired region are sequentially reset row by row, and further wherein the reset operation is performed such that reset of any rows immediately adjacent the desired region is always performed for a selective read operation thereby ensuring that overflow from rows immediately adjacent the desired region does not interfere with signals from the desired region, wherein the second control unit causes reset of adjacent rows both immediately above and below the rows of pixels in the desired region provided that there are rows of pixels both above and below the desired region.

2. The solid-state image pickup device according to claim 1, wherein the number of rows in the regions is changeable in accordance with external setting.

3. The solid-state image pickup device according to Claim 1, wherein the number of rows of each of the regions is set to half the number of rows of the desired region.

4. The solid-state image pickup device according to claim 2, wherein:
the second control unit includes
calculating unit for calculating a start row and an end row of each of the regions in accordance with information on a start row and an end row of the desired region and information on the number of rows of each of the regions, an address counter in which counting start and counting end are controlled in accordance with calculation results of the calculating unit, and an address decode circuit that performs control for a desired row at desired timing in accordance with a count output of the address counter and a timing signal; and the calculating unit includes a subtracter that subtracts the number of rows of each of the regions from the start row of the desired region, an underflow detector that controls the counting start of the address counter when underflow occurs in a subtraction result of the subtracter, an adder that adds the number of rows of each of the regions to the end row of the desired region, and an overflow detector that controls the counting end of the address counter when overflow occurs in an addition result of the adder.

5. The solid-state image pickup device according to claim 3, wherein:

the second control unit includes calculating unit for calculating a start row and an end row of each of the regions in accordance with information on a start row and an end row of the desired region, an address counter in which counting start and counting end are controlled in accordance with calculation results of the calculating unit, and an address decode circuit that performs control for a desired row at desired timing in accordance with a count output of the address counter and a timing signal; and the calculating unit includes a divider that divides the number of rows of the desired region into half, a subtracter that subtracts a division result of the divider from the start row of the desired region, an underflow detector that controls the counting start of the address counter when underflow occurs in a subtraction result of the subtracter, an adder that adds the division result of the divider to the end row of the desired region, and an overflow detector that controls the counting end of the address counter when overflow occurs in an addition result of the adder.

6. The solid-state image pickup device according to claim 5, wherein the divider is a shift divider that performs division by bit shift.

7. A solid-state image pickup device comprising:

a pixel array area in which pixels each including a photoelectric conversion element are two-dimensionally arranged;

a first controller that performs control such that signals of pixels in a desired region of the pixel array area are sequentially read row by row; and a second controller that performs control such that, at least some of the pixels in regions except for the desired region are sequentially reset row by row, and further wherein the reset operation is performed such that reset of any rows immediately adjacent the desired region is always performed for a selective read operation thereby ensuring that overflow from rows immediately adjacent the desired region does not interfere with signals from the desired region, wherein the second control unit causes reset of adjacent rows both immediately above and below the rows of pixels in the desired region provided that there are rows of pixels both above and below the desired region.

* * * * *